(12) United States Patent
Bajer

(10) Patent No.: US 6,357,833 B1
(45) Date of Patent: Mar. 19, 2002

(54) WHEEL COMPONENT WITH CAVITY FOR MOUNTING A HOUSING FOR MEASUREMENT APPARATUS

(75) Inventor: Jacques Jack Bajer, Grosse Pointe, MI (US)

(73) Assignee: Smartire Systems, Inc., Vancouver (CA)

( * ) Notice: Subject to any disclaimer, the term of this patent is extended or adjusted under 35 U.S.C. 154(b) by 0 days.

(21) Appl. No.: 09/351,002

(22) Filed: Jul. 12, 1999

(51) Int. Cl.$^7$ ............................................... B60B 21/00
(52) U.S. Cl. ....................... 301/95; 152/381.6; 340/442
(58) Field of Search ................... 301/37.37, 65, 301/95–98; 152/381.5, 381.6; 220/3, 2; 174/50; 340/442; 200/61.22, 61.23, 61.4, 293, 302.1; 73/146, 146.2, 146.8

(56) References Cited

U.S. PATENT DOCUMENTS

| | | | | |
|---|---|---|---|---|
| 1,771,363 A | * | 7/1930 | Wagenhorst | 152/381.5 |
| 3,999,587 A | * | 12/1976 | Mitchell | 152/381.5 |
| 4,035,028 A | | 7/1977 | Wilcox | |
| 4,048,614 A | | 9/1977 | Shumway | |
| 4,258,771 A | * | 3/1981 | Snyder | 152/381.6 |
| 4,657,289 A | | 4/1987 | Boyer | |
| 4,896,921 A | * | 1/1990 | Sato et al. | 301/95 |
| 5,078,453 A | * | 1/1992 | Siwek | 301/65 |
| 5,163,320 A | * | 11/1992 | Goshima et al. | 340/442 |
| 5,285,189 A | | 2/1994 | Nowicki et al. | |
| 5,427,171 A | | 6/1995 | Prieto | |
| 5,559,484 A | | 9/1996 | Nowicki et al. | |
| 5,602,524 A | | 2/1997 | Mock et al. | 340/447 |
| 5,779,951 A | | 7/1998 | Osborne | |
| 5,956,820 A | * | 9/1999 | Albinski | 340/442 |

FOREIGN PATENT DOCUMENTS

| | | | | |
|---|---|---|---|---|
| FR | 2661373 | * | 4/1990 | |
| JP | 405016623 | * | 1/1993 | 340/442 |

\* cited by examiner

Primary Examiner—Russell D. Stormer
Assistant Examiner—Long Bas Nguyen
(74) Attorney, Agent, or Firm—Knobbe, Martens, Olson & Bear, LLP

(57) ABSTRACT

A wheel component and a method for installing a measurement circuit in a wheel component are disclosed. The wheel component has a surface and a sunken cavity extending below the surface in the wheel component, for holding an insertable housing. The housing may hold an electronic circuit operable to measure a physical property and transmit a measured value to a receiver. The method for installing includes receiving a housing containing the measurement circuit into a sunken cavity in a surface of the wheel component and securing the housing in the sunken cavity.

22 Claims, 4 Drawing Sheets

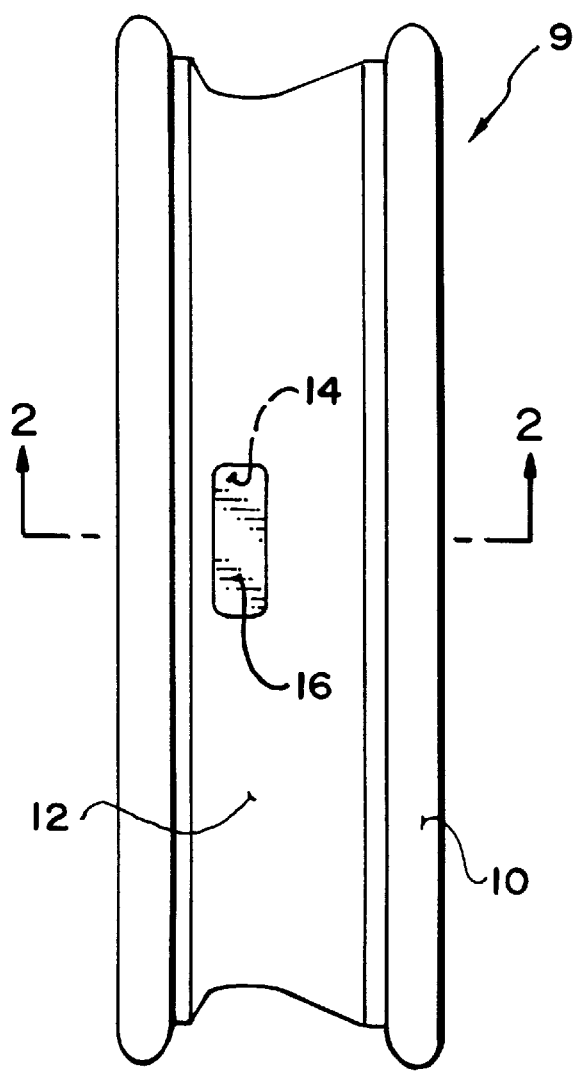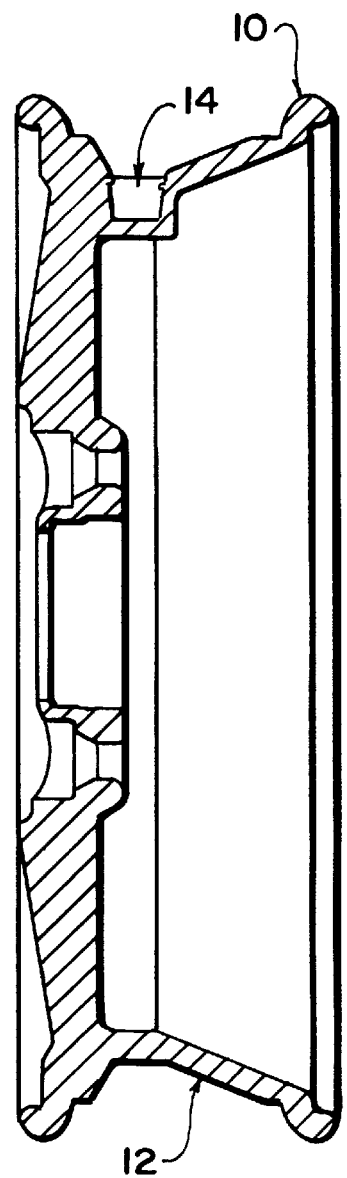
FIG. 1
FIG. 2

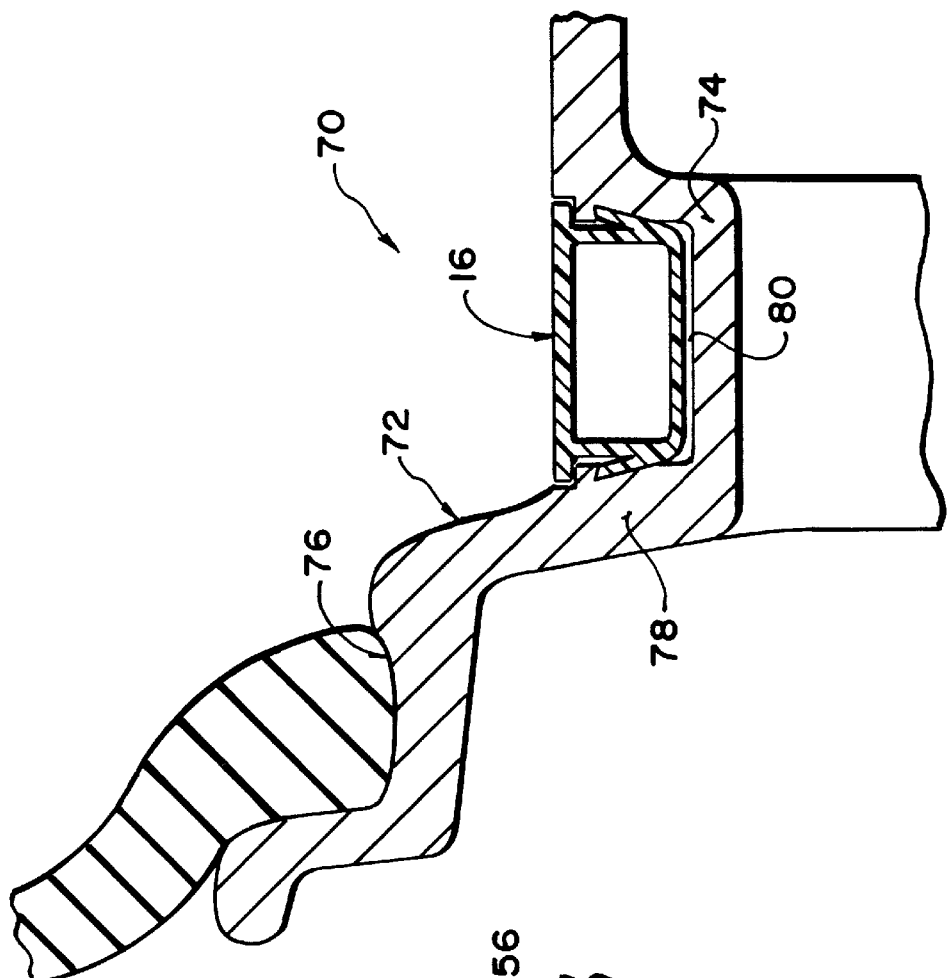
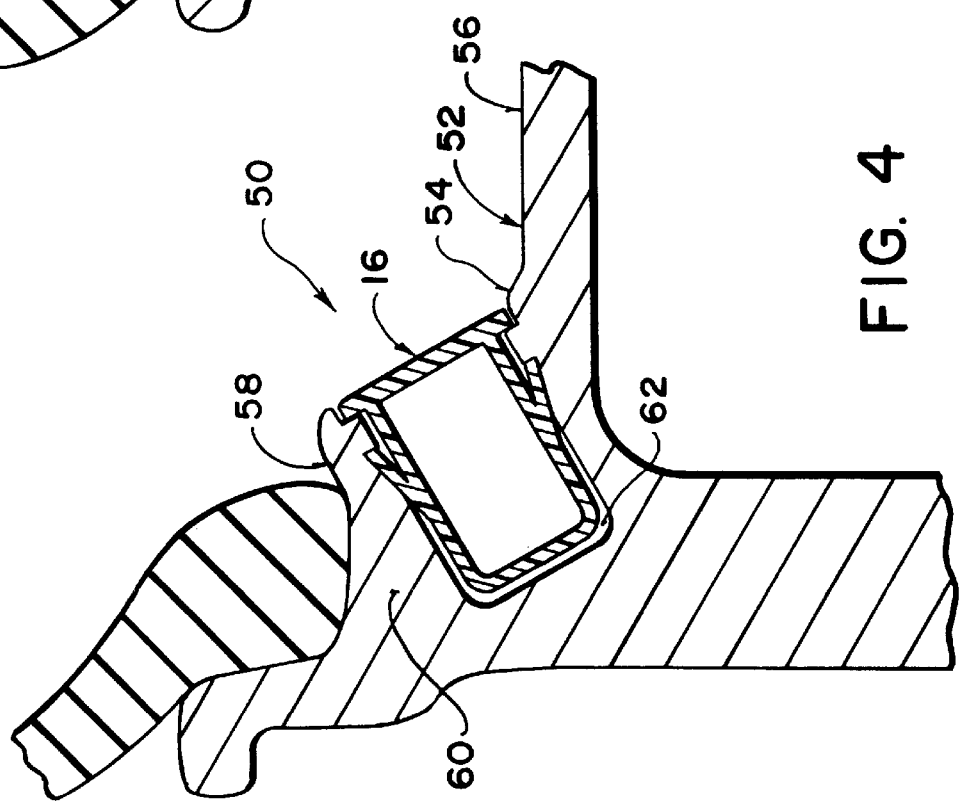

WHEEL COMPONENT WITH CAVITY FOR MOUNTING A HOUSING FOR MEASUREMENT APPARATUS

FIELD OF THE INVENTION

The present invention relates to a wheel component having a cavity for mounting a housing for measurement apparatus.

BACKGROUND OF THE INVENTION

The pressure and temperature of tubeless tires may be remotely monitored using a radio transmitter within the tire to send signals to a remote display mounted in the interior of a vehicle. The sensing device and the electronic circuitry which includes the transmitter and an antenna are generally contained in a sealed housing to protect the components from physical damage and from contamination such as may occur due to tire mounting lubricants, residual chemicals from tire manufacturing, moist and/or dirty air from air filtering bars, run flat tire lubricants, tire sealants and the like.

At the present time, wireless radio frequency tire monitor sensors may be packaged in plastic housings and attached to the inside or outside of tubeless tire wheels, generally with a large metal hose clamp-like straps around the center of the rim well, inside the tire. A disadvantage of such an installation is that the sensor may be damaged during tire installations and service procedures.

Alternatively, a tire monitor may be attached to the valve stem of a tire, either inside or outside the wheel. However, valve stem transmitters add mass to the valve stem itself, increasing forces on the valve stem assembly, and in some cases jeopardizing the effectiveness of the stem to wheel rim pneumatic sealing. Furthermore, externally mounted valve stem monitors are potentially subjected to road hazards and vandalism. Thus, there is a need for an apparatus and method for protecting a tire monitor or other sensing device from physical damage.

SUMMARY OF THE INVENTION

The present invention addresses the above need by providing a wheel component with a cavity for mounting a housing containing a measurement apparatus. The measurement apparatus is protected from physical damage during tire installation or other servicing procedures. Since the measurement apparatus is not attached to a valve stem of a tire, the integrity of the valve stem assembly and pneumatic sealing is not compromised. Also, since the measurement apparatus is not mounted externally to the tire, it is protected from road hazards and other external sources of physical damage.

In accordance with one aspect of the invention, there is provided a wheel component having a sunken cavity in an interior circumferential surface of the wheel component, such component may include the wheel rim or spoke for example, or any other part of the wheel system under pressure. The cavity extends below the interior circumferential surface and is operable to hold an insertable housing. The housing may hold a combined sensing device and transmitter for monitoring and transmitting a physical property such as tire operating conditions which may include inflation pressure, temperature, for example.

Preferably, the wheel component further includes a lock for locking the housing in the sunken cavity. The lock may include a groove in the sunken cavity for engaging a tab on the housing, making the system fastenerless. The lock may be of a snap-on type facilitating automatic assembly of the housing containing the sensing device and transmitter to the wheel component.

Preferably, the housing has a shape complementary to that of the sunken cavity and the wheel component has a recessed shoulder extending about a periphery of the sunken cavity for contacting a lip extending about the housing. Ideally, the lip is positioned on the housing such that a top surface of a top portion of the housing is flush with or below the surface of the wheel component, when the lip is in contact with the recessed shoulder, to avoid interference during tire mounting and removal.

Preferably, the top surface of the housing is permeable to electromagnetic radiation and the housing is operable to hold an electronic circuit operable to transmit electromagnetic radiation through the housing for reception by a receiver located remotely from the wheel component. The electronic circuit may be used to measure a physical property to produce a measured value and transmit the measured value to the receiver.

In accordance with another aspect of the invention, there is provided a method for installing a measurement circuit in a wheel component. The method includes receiving a housing containing the measurement circuit into a sunken cavity in a surface of the wheel component and securing the housing in the sunken cavity. Preferably, the method includes locking the housing in the sunken cavity by engaging a tab on the housing with a groove in the sunken cavity. Receiving the housing in the sunken cavity may be achieved by contacting a lip extending from the housing on a recessed shoulder in the wheel component adjacent the sunken cavity, such that a top surface of a top portion of the housing is flush with or below the surface of the wheel component.

Further aspects of the present invention will be apparent to one of ordinary skill in the art upon reviewing the specific embodiments described in the following detailed description and accompanying drawings.

BRIEF DESCRIPTION OF THE DRAWINGS

In drawings which illustrate embodiments of the present invention,

FIG. 1 is a side view showing a wheel rim for a tubeless tire with a sunken cavity according to one embodiment of the present invention;

FIG. 2 is a sectional view showing the wheel rim of FIG. 1 at line 2—2;

FIG. 4 is a cross sectional view of a wheel rim having a side component in which a sunken cavity is provided;

FIG. 5 is a cross sectional view of a wheel rim showing a sunken cavity in a spoke portion thereof.

DETAILED DESCRIPTION

Referring to FIG. 1, an apparatus according to a first embodiment of the invention is shown generally at 9. The apparatus includes a wheel component, which in this embodiment is a wheel rim shown generally at 10 having a protected interior circumferential surface 12, which is interior to a tire (not shown) mounted thereon. Alternatively, the wheel component may be a wheel spoke, or any other part of the wheel.

A sunken cavity 14 is formed in the wheel component to extend below the surface 12 for holding a plastic insertable housing shown generally at 16 therein. It is preferable that the sunken cavity is formed in a component of the wheel which is protected, which is generally that part of the wheel which is under pressure.

Referring to FIG. 2, in this embodiment the sunken cavity 14 extends radially into the wheel rim.

Figure 3:
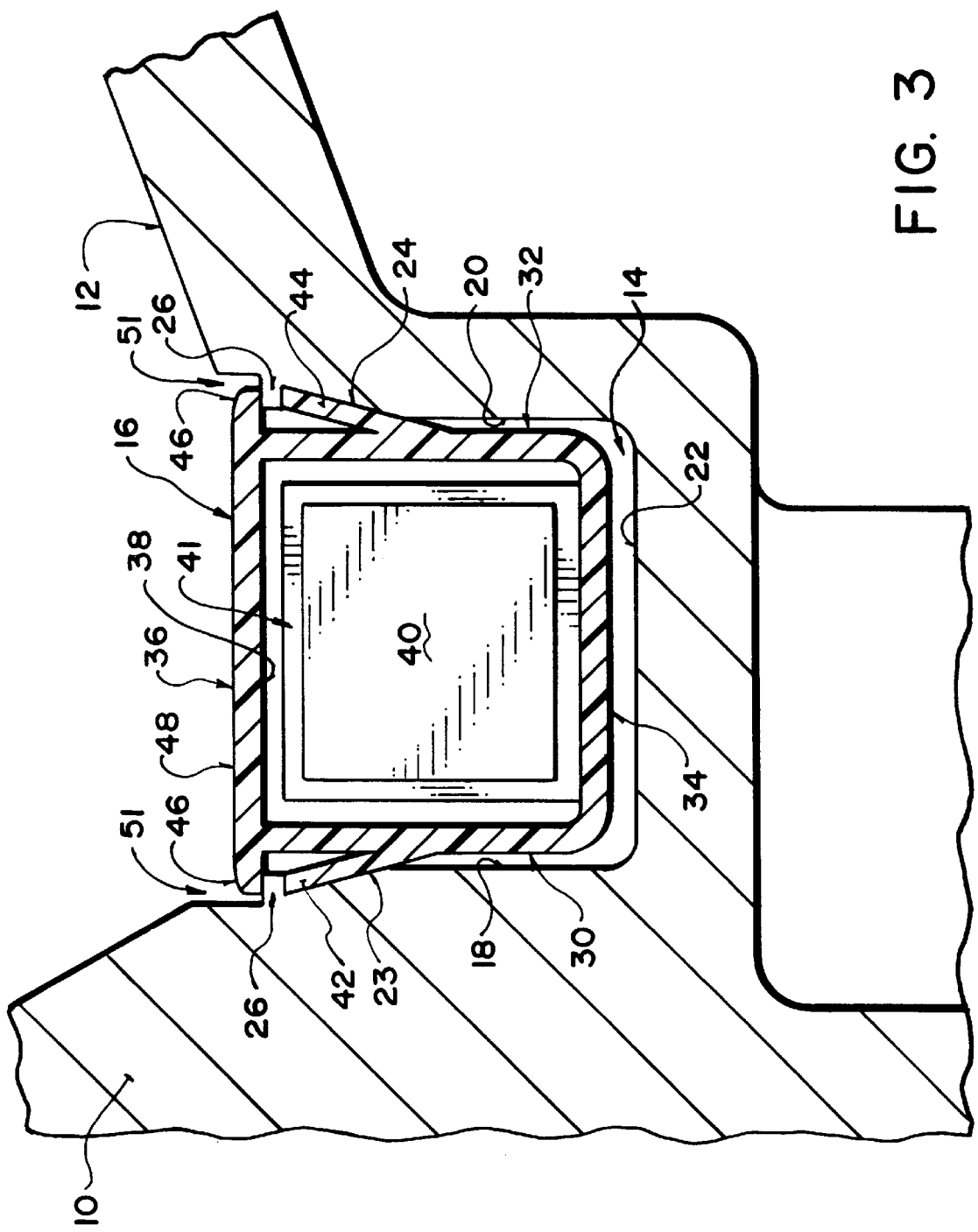
FIG. 3 is a detailed sectional view showing the sunken cavity of FIG. 2.

Referring to FIG. 3, the sunken cavity has first and second sidewalls 18 and 20 and a bottom portion 22 which define a cavity having a square rectangular shape in cross-section. The first and second sidewalls 18 and 20 are formed with first and second angled grooves 23 and 24 respectively, which project into the wheel rim 10 and away from the bottom portion 22. The first and second sidewalls 18 and 20 are terminated in a recessed shoulder portion 26 which extends about the periphery of the sunken cavity 14.

The insertable housing 16 is formed of plastic material, permeable to electromagnetic radiation. The housing has first and second sidewalls 30 and 32, a bottom portion 34 and a top portion 36 which are secured together in such a manner that air and water cannot enter an interior portion 38 of the housing and such that they define a shape complementary to the shape of the sunken cavity. The interior portion of the housing is used to hold an electronic circuit 40 mounted on a circuit board 41, which is secured in the housing by epoxy or other suitable means for rigidly securing the circuit board to the housing 16. The electronic circuit may include tire property sensing circuitry, for example.

The first and second sidewalls 30 and 32 of the housing have respective first and second tabs 42 and 44 which project upwardly and outwardly and which are operable to be received and engaged in respective first and second angled grooves 23 and 24 to act as a lock 51, for locking the housing 16 in the sunken cavity 14.

The top portion 36 of the housing 16 extends slightly beyond the first and second sidewalls 30 and 32 by approximately the same distance as the projecting tabs 42 and 44, such that a lip 46 is formed to extend about the perimeter of the housing 16. The lip 46 is received in the recessed shoulder portion 26 when the housing 16 is received in the sunken cavity 14, such that a top surface 48 of the top portion 36 is flush with the adjacent surface 12, seen best in FIG. 2. Thus, the top portion 36 is slightly convexly curved to follow the curvature of the interior circumferential surface 12.

Alternatively, the recessed shoulder may be more deeply recessed into the wheel rim than shown, such that the top surface 48 is below (i.e., radially inward from) the surface 12 shown in FIG. 1 of the wheel rim. In any event, it is desirable to have the top surface 48 either flush with the surface 12 or sunken below the surface 12, to avoid damage to the housing during maintenance of a tire mounted on the wheel rim 10.

The electronic circuit 40 is operable to measure a physical property of a tire mounted to the wheel rim, the property being pressure or temperature or both, for example. The electronic circuit produces a measured value and includes a transmitter for producing an electromagnetic signal which is radiated through the top portion 36 and through a tire mounted to the wheel rim, for reception by a remote receiver such as may be located in a cab of a vehicle on which the wheel rim is mounted.

Referring to FIG. 4, an apparatus according to a second embodiment of the invention is shown generally at 50. The apparatus includes a wheel rim shown generally at 52 having a protected interior surface 54 extending between an inner web 56 and a tire seat portion 58 of the wheel rim 52. In this embodiment, the wheel rim 52 has a relatively large mass 60 extending between the web 56 and the tire seat portion 58, in which a sunken cavity 62, similar to that shown in FIG. 3, is formed.

Referring to FIG. 5, an apparatus according to a third embodiment of the invention is shown generally at 70 and includes a wheel rim 72 having a spoke portion 74 and a tire seat portion 76. The wheel spoke portion 74 has a relatively large mass portion 78 in which a sunken cavity 80 similar to that shown in FIG. 3 is formed to receive the insertable housing 16 shown in FIG. 3.

Figure 6:
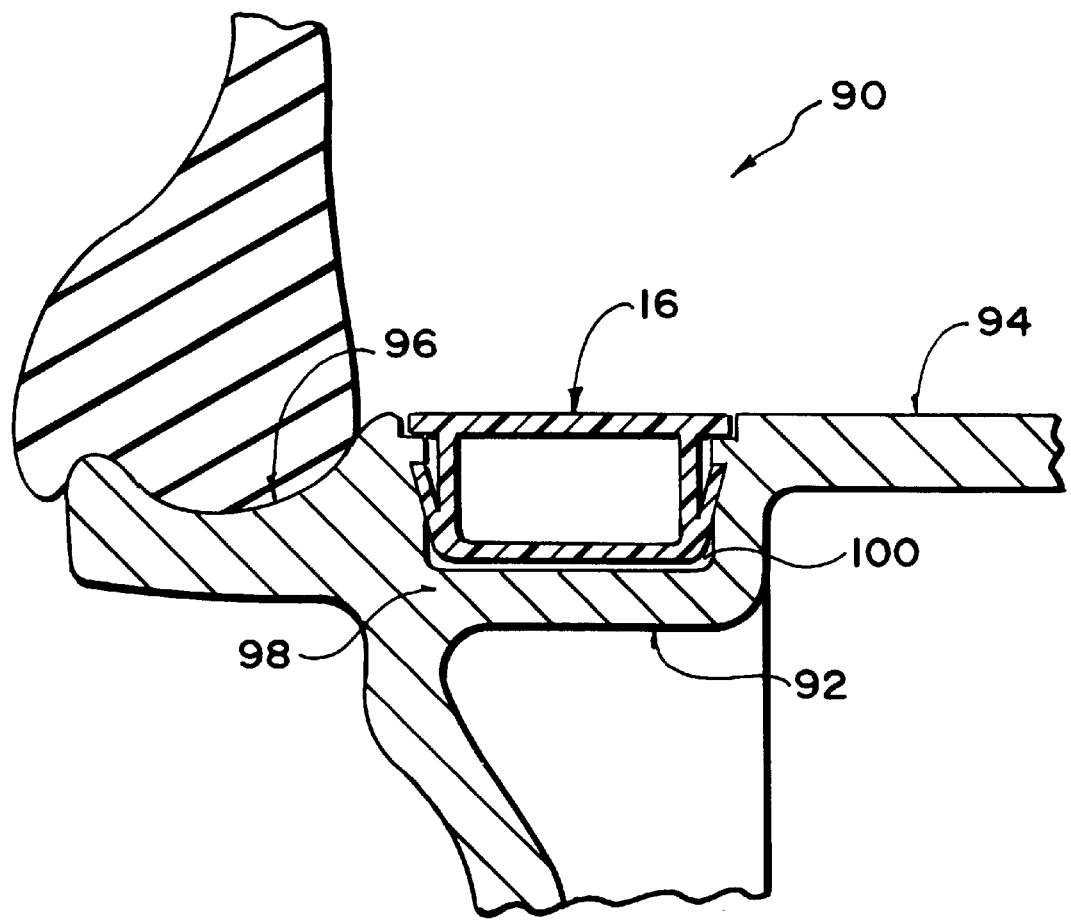
FIG. 6 is a cross sectional view of a wheel rim having a sunken cavity therein.

Referring to FIG. 6, an apparatus according to a fourth embodiment of the invention is shown generally at 90 and includes a wheel rim 92 having a web portion 94 and a tire seat portion 96 disposed approximately in the same plane. The wheel rim has a relatively large mass portion 98 extending between the web portion 94 and the tire seat portion 96 in which a sunken cavity 100 similar to that shown in FIG. 3 is formed to receive the insertable housing 16 shown in FIG. 3. This embodiment is suitable for use with the PAX(TM) wheel/tire system by the Michelin Tire Corporation.

By forming a wheel component with a sunken cavity as described, electronic circuits for measuring and transmitting tire property signals can be installed in a plastic housing of the type described, at a remote location and the plastic housing may simply be received in the sunken cavity which may be located anywhere in the surface of the wheel component. In the embodiment shown in FIG. 1, the housing is secured to the sunken cavity by the cooperation between the first and second angled grooves 23 and 24 and the first and second tabs 42 and 44 respectively. The cooperation between the angled grooves and tabs thus performs the function of locking the housing in the sunken cavity.

It will be appreciated that the housing 16, instead of containing an electronic circuit operable to measure tire pressure or temperature, may alternatively contain a sensor operable to measure any desired physical property, such as centrifugal force for use in calculating speed or vibration, for example.

While specific embodiments of the invention have been described and illustrated, such embodiments should be considered illustrative of the invention only and not as limiting the invention as construed in accordance with the accompanying claims.

What is claimed is:

1. An apparatus for receiving an insertable housing containing a tire operating monitoring device and a transmitter so as to be able to sense an operating condition of a tire and transmit a signal indicative thereof, the apparatus comprising:

a) a wheel component having a protected interior surface and a mounting location for the tire to mount on the wheel component such that when a tire is mounted on the mounting location of the wheel component, the protected interior surface is positioned in a space enclosed by the tire;

b) a sunken cavity that is pre-formed in the protected interior surface so as to extend below said surface, in said wheel component, wherein the sunken cavity is sized so as to receive the insertable housing such that the operating monitoring device and the transmitter is retained in the wheel component in a manner that permits the operating monitoring device to detect the operating condition inside the space enclosed by the tire while reducing exposure of the housing during installation of the tire on the mounting location of the wheel component.

2. An apparatus as claimed in claim 1 further comprising a lock for locking the housing in said sunken cavity wherein said lock includes a groove in said sunken cavity operable to engage a tab on the housing.

3. An apparatus as claimed in claim 1 wherein said wheel component has a recessed shoulder extending about a periphery of said sunken cavity for contacting a lip extending about said housing.

4. An apparatus as claimed in claim 1 wherein said surface includes a protected interior circumferential surface, said sunken cavity being disposed in said interior circumferential surface.

5. An apparatus as claimed in claim 1 further including an insertable housing.

6. An apparatus as claimed in claim 5 wherein said sunken cavity has a first shape and wherein said housing has a second shape complementary to said first shape.

7. An apparatus as claimed in claim 6 further including means for locking the housing in said sunken cavity.

8. An apparatus as claimed in claim 6 wherein said lock includes a tab on the housing and a groove in said sunken cavity operable to engage said tab when said housing is inserted into said sunken cavity.

9. An apparatus as claimed in claim 6 wherein said housing has a lip extending about a periphery thereof and wherein said wheel component has a recessed shoulder extending about a periphery of said sunken cavity for contacting said lip.

10. An apparatus as claimed in claim 9 wherein said housing has a top portion having a top surface and wherein said lip is positioned on said housing such that said top surface is flush with or below said surface of said wheel component, when said lip is in contact with said recessed shoulder.

11. An apparatus as claimed in claim 10 wherein said top surface is permeable to electromagnetic radiation.

12. An apparatus as claimed in claim 1 wherein said surface includes an interior circumferential surface, said sunken cavity being disposed in said interior circumferential surface.

13. An apparatus as claimed in claim 5 wherein said housing is operable to hold an electronic circuit.

14. An apparatus as claimed in claim 5 wherein said housing includes an electronic circuit held within said housing.

15. An apparatus as claimed in claim 14 wherein said electronic circuit is operable to transmit electromagnetic radiation through said housing for reception by a receiver located remotely from said wheel component.

16. An apparatus as claimed in claim 15 wherein said electronic circuit is operable to measure a physical property to produce a measured value and transmit said measured value to the receiver.

17. An apparatus as claimed in claim 1 wherein said wheel component includes a wheel rim.

18. A method of installing a measurement circuit that measures an operating condition of the tire in a wheel component, the method comprising:
   a) receiving a housing containing said measurement circuit, and in a sunken cavity in a protected interior surface of said wheel component;
   b) mounting a tire on a mounting location of the wheel component so as to define an enclosed space such that the sunken cavity is positioned within the space wherein the housing received within the sunken cavity is recess so as to reduce the exposure of the housing during installation of the tire.

19. A method as claimed in claim 18, further comprising operating a lock to lock the housing in said sunken cavity wherein locking includes engaging a tab on said housing with a groove in said sunken cavity.

20. A method as claimed in claim 18 wherein receiving includes contacting a lip extending from said housing on a recessed shoulder in said wheel rim adjacent said sunken cavity such that a top surface of a top portion of said housing is flush with or below said surface of said wheel component.

21. An apparatus comprising:
   a) a wheel component having a surface and a sunken cavity having a first shape extending below said surface, into said wheel component said sunken cavity having a recessed shoulder extending about a periphery thereof;
   b) an insertable housing insertable into said sunken cavity, said insertable housing having:
      i) a second shape complementary to said first shape;
      ii) a lip extending about a periphery of the insertable housing for contacting said recessed shoulder; and
      iii) a top portion having a top surface, said lip being positioned on said housing such that said top surface is flush with or below said surface of said wheel component, when said lip is in contact with said recessed shoulder.

22. An apparatus comprising:
   a) a wheel component having a protected interior surface and a mounting location wherein a tire is mounted to the mounting location of the wheel component and wherein a sunken cavity is formed on the protected interior surface of the wheel component so as to extend below said surface into said wheel component; and
   b) an insertable housing insertable into said sunken cavity so as to be recessed therein to thereby be protected during mounting of the tire on the mounting location of the wheel component said insertable housing being operable to hold an electronic circuit operable said housing having a top portion permeable to electromagnetic radiation.

* * * * *